March 10, 1925.  
T. OLINGER  
DAMPER CONSTRUCTION  
Filed May 6, 1922

1,528,780

Inventor  
Thomas Olinger.  
By Frank E. Liverance, Jr.  
Attorney.

Patented Mar. 10, 1925.

1,528,780

UNITED STATES PATENT OFFICE.

THOMAS OLINGER, OF HOLLAND, MICHIGAN, ASSIGNOR, BY MESNE ASSIGNMENTS, TO FEDERAL MANUFACTURING COMPANY, OF HOLLAND, MICHIGAN, A CORPORATION OF MICHIGAN.

DAMPER CONSTRUCTION.

Application filed May 6, 1922. Serial No. 558,871.

*To all whom it may concern:*

Be it known that I, THOMAS OLINGER, a citizen of the United States of America, residing at Holland, in the county of Ottawa and State of Michigan, have invented certain new and useful Improvements in Damper Constructions; and I do hereby declare the following to be a full, clear, and exact description of the invention, such as will enable others skilled in the art to which it appertains to make and use the same.

This invention relates to a damper construction. It is an object and purpose of the present invention to make a damper adapted for use in pipes of various characters, particularly in connection with furnaces and equip it with a very simple and easily and conveniently assembled mounting therefor whereby the installation of the damper in the pipe or its removal therefrom is very quickly accomplished without the use of tools. Other objects and purposes than that stated, with novel constructions and arrangements of parts for effecting the same will appear from the following description of the invention, in connection with the accompanying drawing illustrating a practical and working embodiment thereof, in which drawing, Fig. 1 is a transverse section through a pipe equipped with the damper construction which is shown in elevation in position for closing the pipe.

Like reference characters refer to like parts in the different figures of the drawing.

Figure 1:
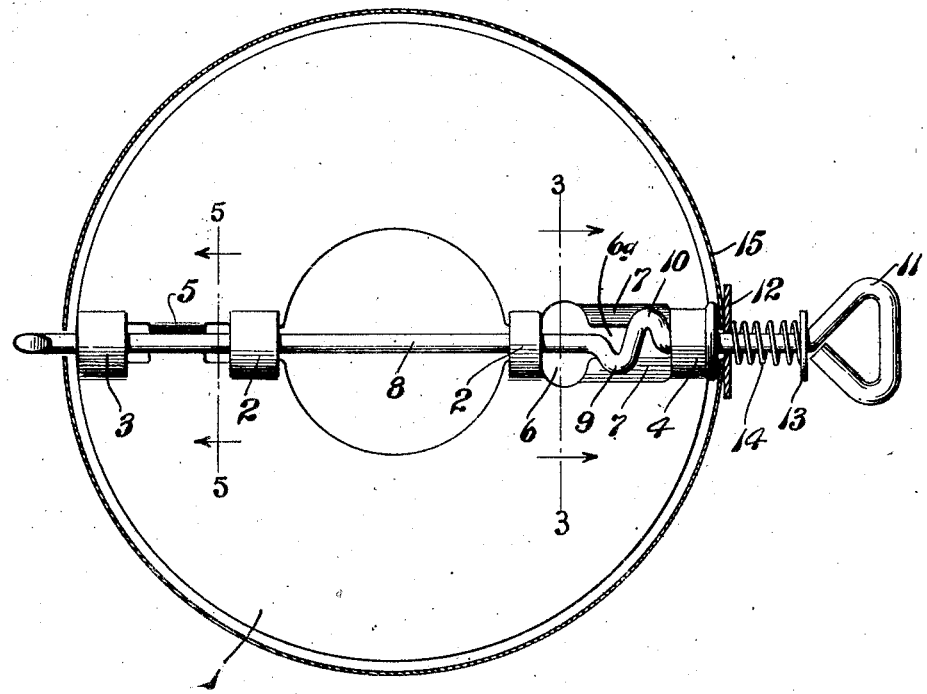
Figure 3:
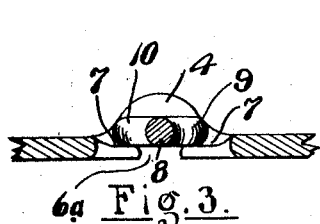
Fig. 3 is a fragmentary enlarged section taken on the plane of line 3—3, of Fig. 1.

The damper disk 1 is of cast metal or may be formed of sheet metal if desired, being circular in outline and having a central opening at the opposite sides of which integrally cast outwardly extending guides 2 are formed which extend in the same direction from the plane of the disk. Similar guides 3 and 4 projecting from the plane of the disk 1 in the same direction as guides 2 are located in alinement with the guides 2 at opposite edges of the disk. Said guides are of concaved formation on their inner sides. Between the guides 2 and 3, a similarly formed guide 5 is located but extending in the opposite direction from the plane of the disk, the concaved recesses on the inner sides of said guides being in alinement.

An opening 6 is made through the disk 1 adjacent the side of the other guide 2 which is opposite the central opening through the disk, said opening being in connection with a slot 6ª extending from the guide 4, as shown. The disk at each side of said slot 6ª is depressed, whereby elongated shallow recesses 7 are formed in one side of the disk, one at each side of the slot and paralleling the full length thereof.

A mounting for the damper disk is used consisting of a rod 8 which at one point in its length is bent to make two oppositely extending bends 9 and 10 spaced a short distance apart, in fact one continuing from the other. The end of the rod nearest said bends is formed into an operating handle 11. Two washers 12 and 13, the former larger in diameter than the other are located on the rod 8 adjacent the handle 11 and a coiled spring 14 is placed around the rod between said washers or disks, as shown.

When the damper disk is in a pipe, such as indicated at 15 and the rod 8 is associated therewith, the end portion of the rod not having the handle 11 thereon passes through the guides 2, 3 and 5 and the two bends 9 and 10 lie over the slot 6ª and extend over the adjacent portions of the damper disk into the recesses 7, that part of the rod beyond said bends being located in the guide 4 and passing through an opening in the pipe 15. Also at the opposite side of the pipe an opening is made for the passage of the end of the rod, as shown. The spring 14 has a tendency to move the rod outward, whereby said bends 9 and 10 are held on the depressed portions of the damper disk in the recesses 7 at the opposite sides of the slot 6ª. It is evident that the damper can be readily turned in either direction by grasping the handle 11, either one part 9 or 10 serving to turn the disk as the rod 8 is turned.

Figure 4:
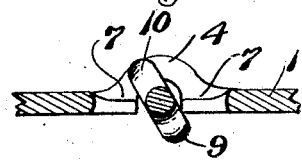
Fig. 4 is a like section on the plane of line 4—4, of Fig. 2.
Figure 2:
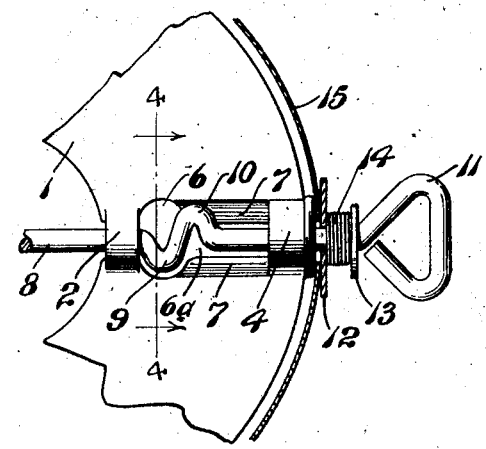
Fig. 2 is a fragmentary like view, showing the damper mounting projected inwardly into the position to which it may be moved to effect disconnection of the same from the damper disk.
Figure 5:
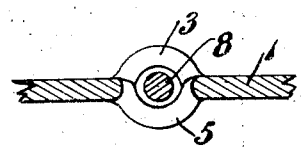
Fig. 5 is a like section on the plane of line 5—5, of Fig. 1.

The connection or disconnection of the rod is accomplished by merely pushing the same inwardly against the spring 14, compressing the same, as shown in Fig. 2, and bringing the inner bend 9 to the opening 6, whereupon the rod may be turned, as shown in Fig. 4, without the disk turning with it, thereby freeing the one side of the disk completely from the rod. The rod may be then withdrawn longitudinally so as to entirely disconnect the same from the disk.

The construction is very simple, the damper consisting substantially of two parts only. It is perfect in operation and its simplicity in construction makes it exceptionally economical in manufacture and durable and efficient in service. The appended claims define the invention which is to be considered as comprehending all forms of structure coming within the scope thereof.

I claim:

1. A damper construction comprising a circular damper disk having a plurality of concaved guides projecting therefrom in alinement on a diameter of the disk and with an opening between two of said guides at one side of the center of the disk, a rod passing through said guides, said rod having two oppositely extending reverse bends therein between said two guides, and spring means tending to move said rod outwardly to position said bends over the disk and out of conjunction with the opening in the disk, said spring being yieldable to bring one of said bends to said opening for disconnection of the rod from the disk.

2. A damper construction, comprising a circular damper disk provided with a plurality of concaved guides projecting therefrom and in alinement with each other on a diameter of the disk, there being two of said guides extending in one direction and a single guide between them extending in the opposite direction at one side of the center of the disk, and two spaced apart guides extending in the same direction at the opposite side of the disk center, the disk being slotted between the two last mentioned guides and having an opening wider than the slot at the inner end of the slot, and a rod passing through the guides, said rod having two oppositely extending reverse bends adapted to lie over the disk at said slotted portion, substantially as described.

3. A damper construction having the elements in combination defined in claim 2, combined with means for yieldingly moving the rod so as to hold the same with said bends over the disk at said slotted portion.

4. A damper construction having the elements in combination defined in claim 2, said plate at each side of the slot being depressed to make longitudinal recesses, one at each side of the slot, substantially as described.

5. A damper construction comprising a circular damper disk having an opening at its center and a slot extending radially therefrom to the periphery of the disk, two spaced apart guides extending from the same side of the disk and over the slot therein, said slot being widened to form an aperture near the inner guide, and a rod passing through the guides and having two oppositely extending reverse bends adapted to lie over the disk at said slotted portion substantially as described.

In testimony whereof I affix my signature.

THOMAS OLINGER.